US008195655B2

(12) United States Patent
Agrawal et al.

(10) Patent No.: US 8,195,655 B2
(45) Date of Patent: Jun. 5, 2012

(54) FINDING RELATED ENTITY RESULTS FOR SEARCH QUERIES

(75) Inventors: Sanjay Agrawal, Sammamish, WA (US); Kaushik Chakrabarti, Redmond, WA (US); Surajit Chaudhuri, Redmond, WA (US); Venkatesh Ganti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 11/758,024

(22) Filed: Jun. 5, 2007

(65) Prior Publication Data

US 2008/0306908 A1      Dec. 11, 2008

(51) Int. Cl.
*G06F 17/30* (2006.01)
(52) U.S. Cl. .................. 707/730; 707/741; 707/748
(58) Field of Classification Search .......... 707/741, 707/748, 723–730, 999.004–999.007, 999.003
See application file for complete search history.

(56) References Cited

U.S. PATENT DOCUMENTS

| | | | |
|---|---|---|---|
| 5,960,430 A | 9/1999 | Haimowitz et al. | |
| 6,067,552 A * | 5/2000 | Yu ................... | 715/234 |
| 6,240,408 B1 * | 5/2001 | Kaufman ............... | 707/730 |
| 6,243,713 B1 * | 6/2001 | Nelson et al. ............. | 707/104.1 |
| 6,295,533 B2 | 9/2001 | Cohen | |
| 6,345,253 B1 * | 2/2002 | Viswanathan ............. | 704/272 |
| 6,804,667 B1 | 10/2004 | Martin | |
| 6,839,701 B1 | 1/2005 | Baer et al. | |
| 6,968,332 B1 | 11/2005 | Milic-Frayling et al. | |
| 6,975,766 B2 | 12/2005 | Fukushima | |
| 7,076,485 B2 | 7/2006 | Bloedorn | |
| 7,152,060 B2 | 12/2006 | Borthwick et al. | |
| 7,287,019 B2 | 10/2007 | Kapoor et al. | |
| 7,730,060 B2 * | 6/2010 | Chakrabarti et al. ......... | 707/723 |
| 8,046,339 B2 | 10/2011 | Chaudhuri et al. | |
| 2002/0147710 A1 | 10/2002 | Hu | |
| 2003/0033288 A1 * | 2/2003 | Shanahan et al. .............. | 707/3 |
| 2003/0037043 A1 * | 2/2003 | Chang et al. ................ | 707/3 |
| 2004/0139072 A1 | 7/2004 | Broder et al. | |
| 2004/0249789 A1 | 12/2004 | Kapoor et al. | |
| 2005/0027717 A1 | 2/2005 | Koudas et al. | |
| 2005/0216443 A1 * | 9/2005 | Morton et al. ................ | 707/3 |
| 2005/0222977 A1 * | 10/2005 | Zhou et al. ................ | 707/3 |
| 2005/0234881 A1 * | 10/2005 | Burago et al. ................ | 707/3 |
| 2006/0047691 A1 | 3/2006 | Humphreys et al. | |
| 2006/0117003 A1 | 6/2006 | Ortega et al. | |

(Continued)

OTHER PUBLICATIONS

Pasca, "Acquisition of Categorized Named Entities for Web Search", Google Inc., CIKM, ACM, Nov. 8-13, 2004, pp. 137-145.

(Continued)

*Primary Examiner* — Mohammad Ali
*Assistant Examiner* — Amanda Willis

(57) ABSTRACT

Architecture for finding related entities for web search queries. An extraction component takes a document as input and outputs all the mentions (or occurrences) of named entities such as names of people, organizations, locations, and products in the document, as well as entity metadata. An indexing component takes a document identifier (docID) and the set of mentions of named entities and, stores and indexes the information for retrieval. A document-based search component takes a keyword query and returns the docIDs of the top documents matching with the query. A retrieval component takes a docID as input, accesses the information stored by the indexing component and returns the set of mentions of named entities in the document. This information is then passed to an entity scoring and thresholding component that computes an aggregate score of each entity and selects the entities to return to the user.

20 Claims, 15 Drawing Sheets

U.S. PATENT DOCUMENTS

| | | |
|---|---|---|
| 2006/0122978 A1 | 6/2006 | Brill et al. |
| 2006/0161522 A1 | 7/2006 | Dettinger et al. |
| 2006/0282414 A1 | 12/2006 | Sugihara et al. |
| 2008/0306945 A1 | 12/2008 | Chaudhuri |

OTHER PUBLICATIONS

Agichtein et al., "Querying Text Databases for Efficient Information Extraction", Columbia University, ICDE, IEEE, 2003, pp. 1-12.

Popov et al., "KIM—Semantic Annotation Platform", vol. 2870, Springer Berlin, 2003, pp. 16.

Cheng et al., "Entity Search Engine: Towards Agile Best-Effort Information Integration over the Web", CIDR, 2007, pp. 6.

Absolute Astronomy.com; Hyperrectangle; http://www.absoluteastronomy.com/topics/Hyperrectangle; Jun. 4, 2009; pp. 1-2.

Answers.com; Dictionary: normalize; http://www.answers.com/topic/normalize; Jun. 4, 2009; Dec. 14, 2009; 1 page.

Chaudhuri, et al.; "A Primitive Operator for Similarity Joins in Data Cleaning"; IEEE; 2006; pp. 1-12.

Chaudhuri, et al.; "Robust and Efficient Fuzzy Match for Online Data Cleaning"; SIGMOD; Jun. 9-12, 2003; ACM 2003; pp. 313-324.

Cohen; "Integration of Heterogeneous Databases Without Common Domains Using Queries Based on Textual Similarity"; IGMOD; 1998; ACM; pp. 1-12.

Shekhar et al.; Encyclopedia of GIS; Springer; 2008 ISBN; http://books.google.com/books?id=6q2IOfLnwkAC&pg=PA1060&lpg=PA1060&dq=%22skyline%22+and+hyperrectangle&source=bl&ots=-0W9n5170n&sig=tAbEKGE-OTd3lmYuqYTx0BXN730&hl=en&ei=aP8nSrnQK4mEtwfX0My1Bg&sa=X&oi=book_result&ct=result&resnum=1#PPA1056,M1; Dec. 1, 2009; 1 page.

Silva et al.; "The Similarity Join Database Operator*"Department of Computer Science, Purdue University, Indiana, USA; Microsoft Corporation, Washington, USA; Nov. 19, 2009; pp. 1-12.

Vance, et al.; "Rapid Bushy Join-Order Optimization with Cartesian Products": Jun. 1996; Proceedings of AMC SIGMOD Conference of Management of Data; pp. 35-46.

Webopedia; "What is a query?"; http://www.webopedia.com/TERM/q/query.html; Jul. 8, 2010; 1 page.

\* cited by examiner

FINDING RELATED ENTITY RESULTS FOR SEARCH QUERIES

BACKGROUND

The emergence of global communication networks such as the Internet and major cellular networks has precipitated interaction between users and other network entities. Not only are cellular and IP networks now a principal form of communications, but also a central means for interacting with other users for most purposes. Network users now have mechanisms for searching and communicating on virtually any topic of interest. However, this vast resource of information can also be an impediment to finding information as the sources and amount of information continue to grow with no end in sight. This presents a formidable challenge when trying to find the information desired.

With respect to web searches, conventional Internet search engines allow users to enter keyword queries and return links to relevant web pages. Each link is accompanied by the title of the web page and a short contextual description of the page. Some internet search engines also return "related searches" in order to help users to refine queries in case the desired information was not returned. In many scenarios, returning named entities such as names of people, location, organization, products, etc., related to the user query, in addition to links and query suggestions, can significantly improve the whole page relevance. These related entities complement algorithmic results and query log-based query suggestions.

However, given the already vast amount of information available and increasing number of new data sources coming online and the differing types of data being provided, finding these more focused and relevant resources of information can be difficult.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a technique for finding related entities for web search queries. Returning entities related to a user query significantly improves whole page relevance.

The architecture includes an extraction component that takes a text document as input, analyzes the document and outputs all the mentions (or occurrences) of named entities such as names of people, organizations, locations, products, etc., in the document. For each mention, the extraction component outputs the entity name, the entity type, the position in document where the mention occurs and other information. An indexing component takes a document identifier (docID) and the set of mentions of named entities in the document and, stores and indexes the information such that a retrieval component can access the information efficiently.

A document-based search component takes a keyword query and returns the docIDs of the top documents matching with the query. A retrieval component takes a docID as input, accesses the information stored by the indexing component and returns the set of mentions of named entities in the document. This information is then passed to an entity scoring and thresholding component that computes an aggregate score of each entity and selects the entities, if any, to return to the user for the given query.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
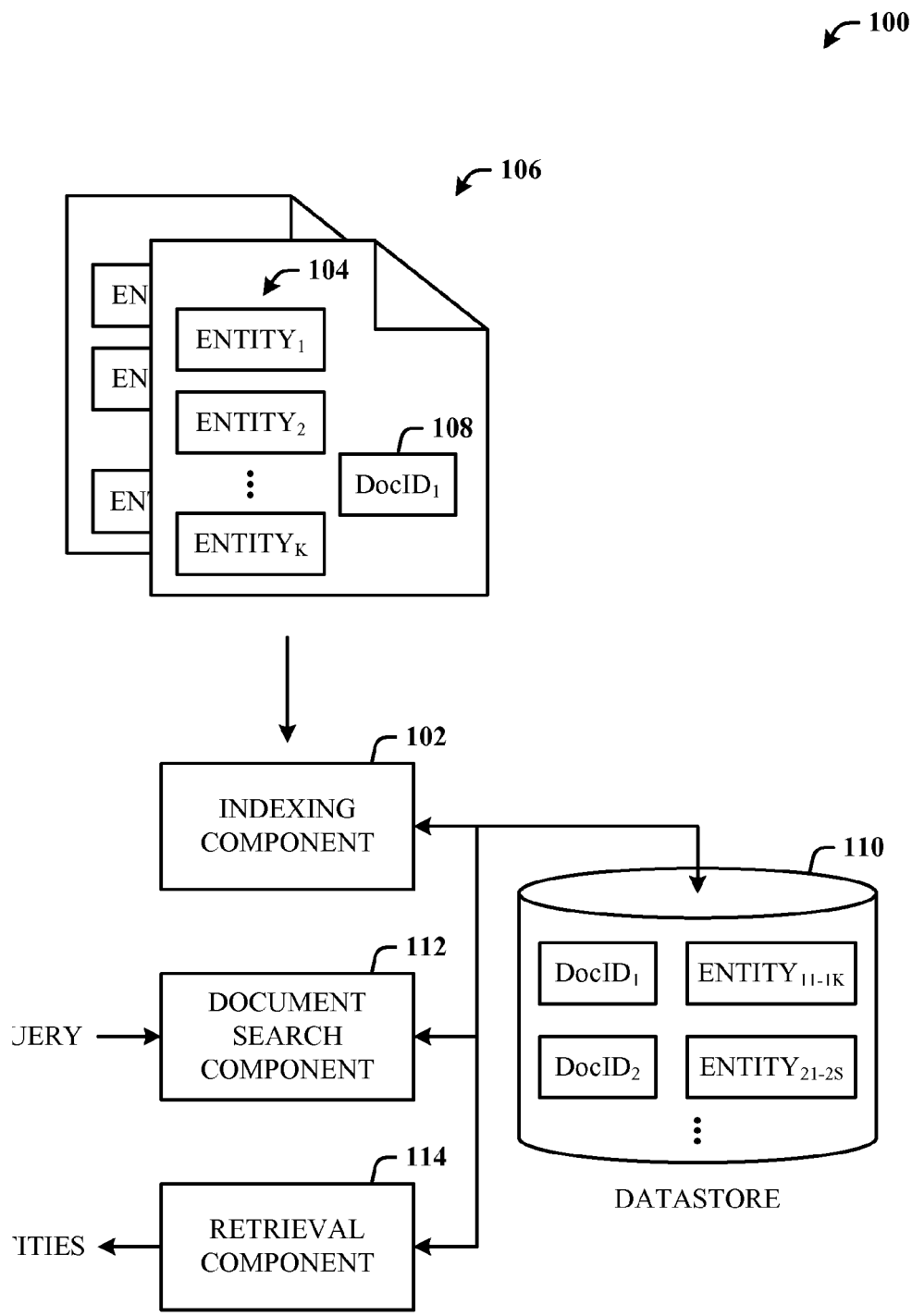
FIG. 1 illustrates a computer-implemented search system for finding entities related to a query.

The disclosed architecture includes robust matching techniques for finding related entities for a query. The entities returned are relevant to the keywords of the query. The techniques provide coverage for the available sources of documents, accuracy for extracting valid named entities, indexing of the extracted data, retrieval of relevant information, and document ranking by aggregating the entities over the top matching documents. Entity scoring and thresholding is provided for determining which entities should be finally returned to the user, and hence, has significant effect on the quality of the results.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Before finding entities related to a given query, the "universe" of named entities (the entire set of named entities appearing on the web) can be obtained. Accordingly, named entity recognition technology can be used to reliably extract named entities such as names of persons, organizations, locations, dates, etc., from web pages. This not only yields the named entities, but also the relationship information (e.g., which web page contains which entity). Note that although described in the context of textual documents, keywords of a query can be processed to find related content and entities associated with multimedia data, such as audio, video, and images, for example.

Referring initially to the drawings, FIG. 1 illustrates a computer-implemented search system 100 for finding entities related to a query. The system 100 includes an indexing component 102 for storing and indexing document entities 104 (denoted $ENTITY_1, ENTITY_2, \ldots, ENTITY_K$, where K is a positive integer) of documents 106, the documents 106 stored in association with corresponding document identifiers 108 (denoted DocIDx, where x is a positive integer) in a datastore 110.

A document-based search component 112 is provided for processing a keyword query (QUERY) and returning the document identifiers of documents associated with results of the query. The document search component 112 processes a keyword of the query and returns top documents of the query results.

A retrieval component 114 of the system 100 then takes the document identifiers and retrieves the corresponding document entities. The retrieval component 114 retrieves the document entities for the top documents and number of mentions of the document entities.

As currently illustrated in this embodiment, all of the components (102, 112 and 114) interface to the datastore 110. However, optionally, the document search component 112 does not need to interface directly to the datastore 110.

The document entities include names of people, organizations, locations and/or products and each document entity is associated with an entity name, entity type and/or entity position in the document. Subsequent processing of the entities and associated information can include ranking and returning the entities to the user for presentation.

Figure 2:
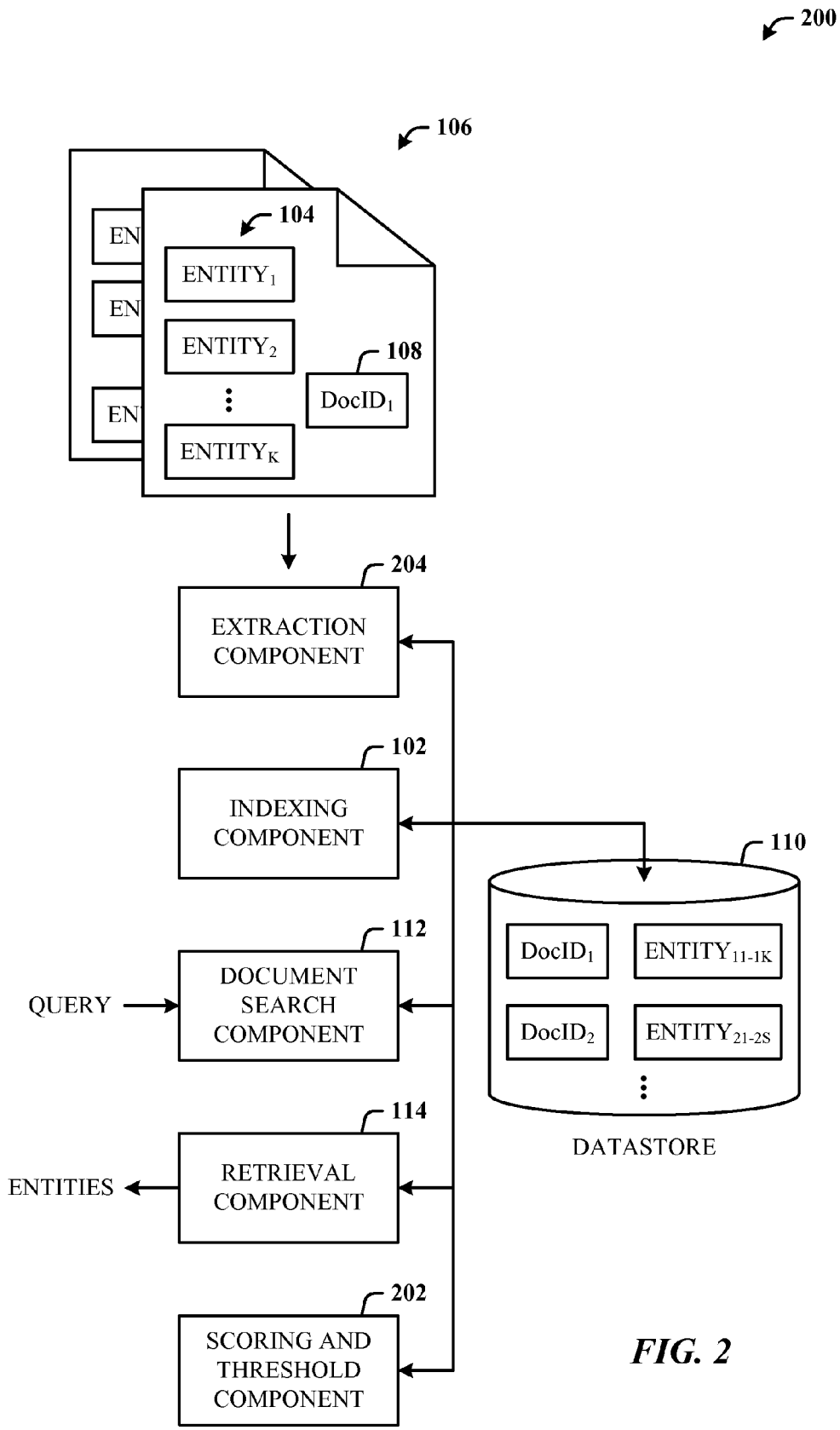
FIG. 2 illustrates an alternative search system that includes scoring and thresholding for results processing.

FIG. 2 illustrates an alternative search system 200 that includes scoring and thresholding for results processing. The system 200 includes the indexing component 102, datastore 110, document-based search component 112 and retrieval component 114 of FIG. 1. The system 200 further includes a scoring and threshold component 202 for receiving the document entities and a value associated with the number of mentions of the document entities for the top documents. The component 202 also computes an aggregate score for each of the document entities.

An extraction component 204 of the system 200 takes a document 106 (e.g., text, image, audio, video, etc.) as input, analyzes the document and outputs all mentions of named entities such as the names of people, organizations, locations, products, etc., in the document. For each occurrence of the entity, the extraction component 204 outputs the entity name, the entity type, the position in document of the entity, and/or possibly other information. In other words, the extraction component 204 takes the documents 106 as input, and outputs the association of the entity 104 and document ID 108 to the indexing component 102. The output of the indexing component 102 is to the datastore 110. The search component 112 receives the query and outputs the matching document IDs.

Since named entity extraction requires analyzing the all content of a document and is typically an expensive operation, it should not be performed at query time. Accordingly, in one implementation, the extraction component 204 is invoked on each document in the collection in advance and passes the output to the indexing component 102 for storing and indexing in the datastore 110.

At query time, the document search component 112 is invoked to obtain the top matching documents for the given keyword query. The retrieval component 114 is then invoked for each of the top N documents (where N is an integer and a parameter of the system 200) to obtain the entities mentioned in those documents along with associated information such as number of occurrences (or mentions), position of the mentions, etc. In other words, the retrieval component 114 receives the document IDs, and then uses the document IDs against the datastore 110 to return the document entities and the other occurrence information. This information is then passed to the entity scoring and thresholding component 202 which computes the aggregate score of each entity and picks the entities, if any, to return to the user for the given query. Note that this functionality can be implemented efficiently in many different settings such as the Internet, intranet, desktop, etc., for example.

Returning entities related to the user query can significantly improve whole page relevance. This functionality is referred to as entity search. For some queries, the user may be looking for "answers" instead of links to documents and the related entity(s) can be the answer(s) the user is searching. This is similar to question answering (QA), except for the following distinctions. First, the queries can be posed as keyword queries instead of natural language queries. Second, the user does not need to specify whether answers or links are being sought. Such queries are referred to as QA-type queries. Following are example natural language query results when using the disclosed techniques.

For QA-type queries, a query for "microsoft ceo" returns Steve Ballmer, a query for "microsoft founder" returns Bill Gates and Paul Allen, a query for "Seattle mayor" returns Greg Nickels, a query for "richest man" returns Bill Gates, a query for "Federal Reserve chairman" returns Ben Bernanke and Alan Greenspan, and a query for "Da Vinci Code author" returns Dan Brown.

For some queries, the related entities can further serve as query suggestions helping users to refine an earlier query or reformulate a completely new query (that has no overlap with the earlier query). For example, consider the following queries.

A commerce-based query for "lightweight laptop", "camcorder with good low light performance", etc., can return the names of related entities (e.g., product) that help the user to quickly narrow down a small set of products that best match the criteria. The user can then issue those product names as queries, explore the queries further and then pick the best result.

News-based queries such as "enron fraud", "Clinton scandal" and "katrina", for example, return names of related entities that provide associated information such as people and organizations involved in the events, where it occurred, etc., which not only increase the awareness of that event, but also suggest to the user new ways (e.g., by reformulating new queries) to explore more about the events.

Entertainment-based queries such as "james bond" and "tom hanks", for example, return names of related entities such as actors/directors for movie name queries, author for book queries, movie names for actor queries, etc. This gives user more information about a topic of interest and new ways to reformulate queries.

Travel-based queries such as "san diego waterfront hotel" and "snorkeling pacific", for example, return the hotel names/locations that can help the user to quickly narrow down on a few travel destinations/hotels which can further be explored by issuing new queries.

Note that the related entities complement the algorithmic results and query log-based query suggestions since neither of them typically return named entities. Related entities can be surfaced on the results page in a number of ways. For example, the entities can be presented among query-log based query suggestions or as a separate block of suggestions, or as a link which when selected displays the related entities.

Figure 3:
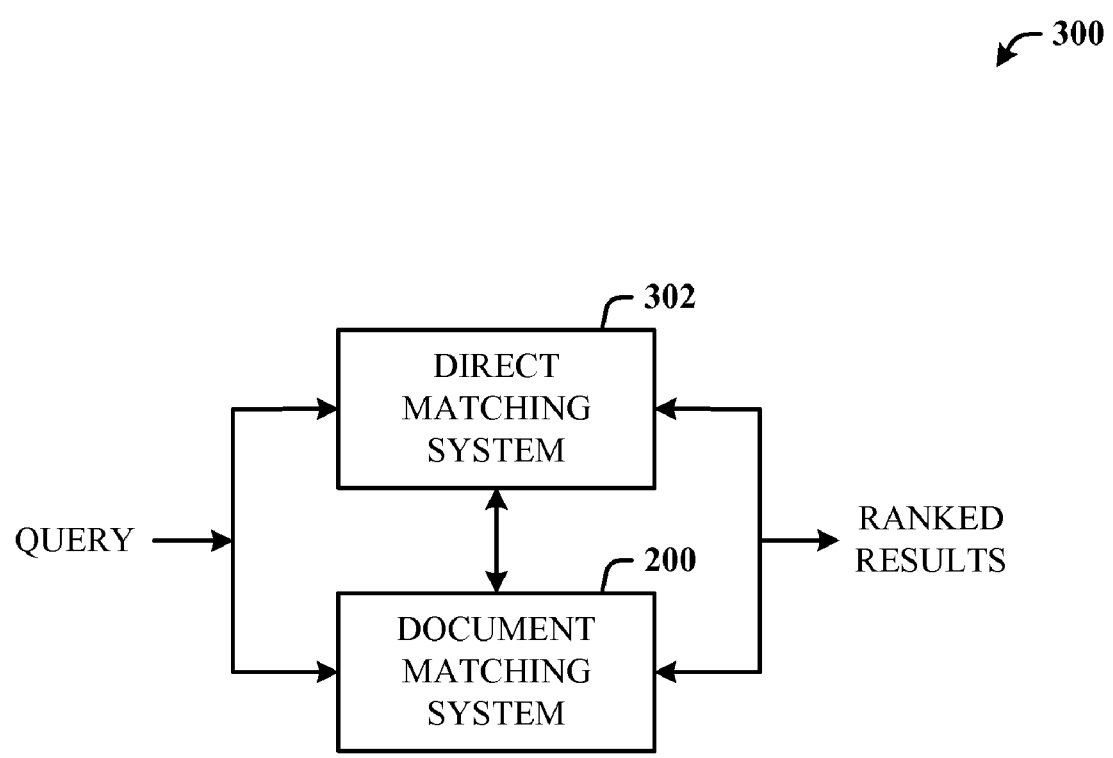
FIG. 3 illustrates an alternative system that employs a direct matching and the document-based matching system.

FIG. 3 illustrates an alternative system 300 that employs a direct matching 302 and the document-based matching system 200. A full entity matching solution can contain both the direct matching component 302 and the document-based matching component 200.

Direct matching is a technique that finds the entities that directly match with the query, that is, entities the names and/or descriptions of which contain one or more of the query keywords. The entities are then ranked based on the number of matching keywords, the inverse document frequency (IDF) of the keywords, etc.

This can be implemented by treating the entity names/descriptions as "small documents" and building an inverted index on the documents. When employed alone, the direct matching technique can fail to produce the related entities. For example, consider the queries "enron fraud", "james bond" or "snorkeling pacific". Since the related entities (e.g., Ken Lay for "enron fraud") do not contain the query keywords, direct matching will fail to produce those entities. In case of commerce queries, it produces the right answers in some cases (e.g., "dell laptop", "sony camcorder") but not in cases when the users query using desired features of the product (e.g., "lightweight laptop", "camcorder with good low light performance").

In order to compensate for natural language based queries the document-based matching system 200 of FIG. 2 can be employed. It can be observed that although the query may not directly match with the related entities, the documents matching with the query will typically mention those entities. For example, documents matching with the query "enron fraud" (e.g., news articles about Enron fraud) will typically mention the entities involved in that event. These occurrences (or mentions) often are present in close proximity to the occurrence of the keywords in the document. The most related entities are typically mentioned more frequently and in closer proximity to the keywords in the top matching documents than the less related entities.

Figure 4:
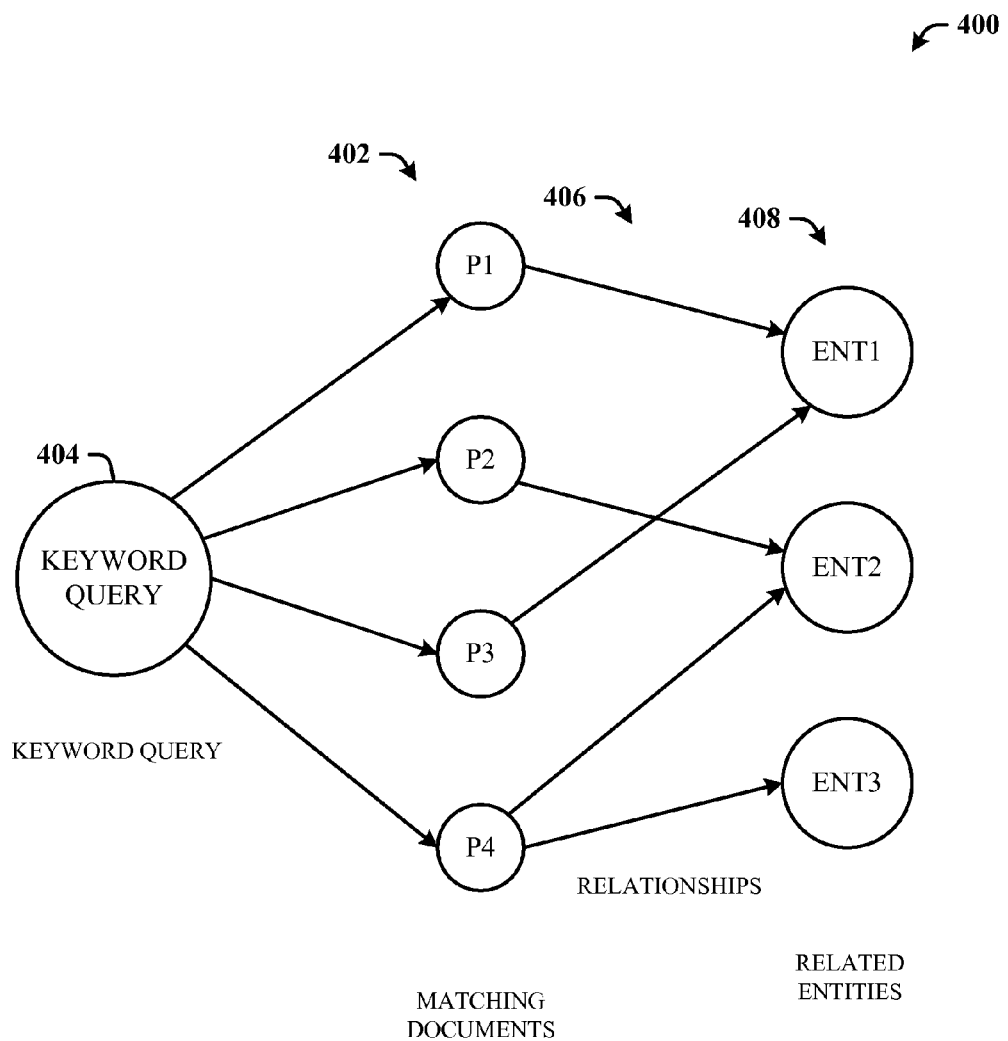
FIG. 4 illustrates that when using document-based matching, related entities can be found in a few steps.

FIG. 4 illustrates that when using document-based matching, related entities can be found in a few steps. Given that the named entities have been extracted from all web pages along with the relationship information, the related entities can be found quickly (e.g., in two steps). First, the top N matching documents 402 are obtained for a keyword query 404 as computed by a search engine. Second, relationship information 406 is accessed to obtain the entities 408 mentioned in the documents (e.g., web pages), the aggregate score computed, and the entities ranked based on the score. Note that this technique also works for commerce queries even when the user query uses desired features of the product.

Following is a more detailed description of the various components of the disclosed architecture.

Extraction component. Typically, there are two subsystems of a web search engine: a crawling/index building subsystem and a query serving subsystem. As described supra, the extraction process should be carried out during the crawling/index building phase. The index builder (which can be multithreaded) takes web pages fetched by the crawler, converts the web pages to UTF-8 (8-bit Unicode transformation format) encoding, parses the text, and populates the inverted index. The extraction component is invoked after the parsing step in the index building pipeline. It is to be appreciated that a conventional named entity extractor can be used as the extraction component.

The extraction component can run as a service on the index building machine. The index building process and the extractor service communicates using named pipes. Once the index builder gets back the extracted entities (from the extractor service) for the current document, the indexing component can be invoked to store and index the document by docID and associated entities such that this information can be retrieved efficiently by the retrieval component. The overhead of the extraction component should be low enough to keep the throughput of the crawl/index building pipeline at acceptable levels. The requirement for the query time components, such as document search, retrieval and scoring/thresholding, is more stringent in that these processes should not slow down the response time for web queries.

The disclosed implementation of the indexing component inside the search engine infrastructure will now be described. A search engine maintains two main data structures: the inverted index and the document index. The inverted index is indexed by wordID and contains, for each word, a list (called a doclist) of all occurrences of the word in all documents. The document index is indexed by docID and contains, for each document, the metadata associated with the document such as URL, title, etc. as well as a pointer to raw content of the document.

The search engine can use the inverted index to obtain the relevant docID and then access the document index to obtain the URL, title and generate the contextual descriptions. Since the named entities are indexed by docID, the named entities (and the associated information) are stored in the document index as a new metadata field. This implementation has minimal overhead since the document index is already being accessed during index building in order to store the other metadata. Another advantage is that it allows the retrieval component to piggyback on the caption generation process when retrieving the named entities. This reduces the overhead of the retrieval component as well. The metadata section of the document index is typically extensible making it easy to add the new information.

An ideal case would be to be extract entities from all pages on the web. This reduces the chance of missing related entities for any query. One implementation takes an average of about ten milliseconds per document to extract entities. This imposes an overhead on the index building process and reduces the throughput the crawl/index building pipeline. In cases where this throughput is acceptable, entities can be extracted from all web pages.

Otherwise, the average extraction time can be reduced by extracting from a fraction of pages on the web. For example, to reduce the overhead to five milliseconds per document, extraction can be reduced to about 50% of the web pages. In this case, pages can be selected from which to extract entities to maximize the probability of obtaining entities extracted from the top matching documents for any user query. One option is to extract entities from the pages returned with high static rank. Other selection criteria are also possible.

With respect to the document search component, in a web search setting, the web search engine is itself the document search component. This component is invoked to return the algorithmic results to the user. The docIDs of the top N document results are intercepted and passed to the retrieval component.

One implementation of the retrieval component will now be described. After the web search engine obtains the docIDs of the top matching documents for the given query, the engine invokes a caption generator to generate the contextual descriptions (CDs) for the top ten or twenty documents for presentation to the user. To generate the CDs for the given docIDs, the CD generator accesses the document index and retrieves the metadata for the docIDs. The generator also accesses the raw content of the page to generate the query-dependent caption.

Since the indexing component stores the extracted entities in the document index, the retrieval component can piggyback on this CD generation process and retrieve the extracted entities at the same time. Note that if the CDs are generated for ten top documents, the cost to retrieve entities for those ten documents is free. However, it may be desirable to retrieve entities for more documents (e.g., twenty or even fifty). This additional document retrieval may incur extra overhead. The retrieved entities for the top N documents along with the associated information (e.g., entity type, position of mention, etc.) are passed to the scoring and thresholding system for picking the most related entities.

The scoring and thresholding component takes the entity occurrences (or mentions) and the associated information (e.g., type of entity, position of mention, etc.) for the top N matching documents $\{d_1, d_2, \ldots, d_N\}$, computes the aggregate score of each entity, and selects the entities, if any, to return to the user. This component can also perform standardization of entity names, for example, Jeff→Jeffrey, Co/Corp.→Company, as well as entity reconciliation such as Microsoft→Microsoft Corporation or Donald Kluth→Donald E. Kluth, for example.

With respect to score computation, the score of an entity e appearing in one or more of the top N documents is computed as follows (the score of all other entities is zero by this definition, and hence, not considered):

$$\text{Score}(e) = \text{AggInterDoc}_i(\text{DocImportance}(d_i) * \text{Score}(d_i, e))$$

where $\text{DocImportance}(d_i)$ is the importance of document $d_i$, $\text{Score}(d_i, e)$ is the $d_i$'s contribution to the overall score of e, and AggInterDoc is a function that aggregates the scores across all the N documents. Several choices are possible for DocImportance and AggInterDoc. For example, the relevance score of the document can be used as the importance of the document. For AggInterDoc, intuitively, the function should be monotonic. For example, sum can be as AggInterDoc. The scoring framework allows all such choices.

$\text{Score}(d_i, e)$ is computed as follows:

$$\text{Score}(d_i, e) = 0 \text{ if } e \text{ is not mentioned in } d_i$$
$$= \text{AggIntraDoc}_j(\text{Score}(d_i, m_j^e)),$$

where $\text{Score}(d_i, m_j^e)$ is the score of the $j^{th}$ mention $m_j^e$ of e in document $d_i$ and AggIntraDoc is a function that aggregates the scores across all mentions within a document. The score $\text{Score}(d_i, m_j^e)$ of a mention $m_j^e$ of an entity e in a document $d_i$ is computed based on proximity of the mention to the keywords in the document. One way to compute proximity is to obtain, along with the docIDs, the positions of the keywords in the top matching documents from the document search component, and then compute the score as a decreasing function of the gap between the keyword positions and $m_j^e$'s position. This could require changes to the document search component as it typically does not output this information.

A simpler implementation can be employed. While the document search component does not output keyword positions, the search component does output a CD for the top matching documents for presentation to the user. This information is passed to the scoring and thresholding component along with the docID. The score $\text{Score}(d_i, m_j^e)$ can be computed as follows:

$$\text{Score}(d_i, m_j^e) = \text{HIGH\_SCORE, if } m_j^e \text{ is present in CD of } d_i$$
$$= \text{LOW\_SCORE; otherwise.}$$

where HIGH_SCORE and LOW_SCORE are two constants $0 \leq \text{LOW\_SCORE} < \text{HIGH\_SCORE} \leq 1$. In one exemplary implementation, HIGH SCORE=0.7 and LOW_SCORE=0.3.

The above scoring function produces a ranking of all the entities occurring in the top N matching documents. A next task is to decide which entities to return to the user. A machine learning model (e.g., support vector machine) can be employed to select the entities to return to the user. For the top entities, feature vectors can be generated consisting of occurrence statistics in each of the N documents, as well as overall scores of neighboring entities in the ranking. Following is an example of a feature vector for an entity e:

[NumMentionsInCD($d_1$,e) NumMentionsOutCD($d_1$,e) ... NumMentionsInCD($d_N$,e) NumMentionsOutCD($d_N$,e) Score(e) Score(next_1(e)) ... Score(next_$n$(e))]

where NumMentionsInCD($d_i$,e) denotes the number of mentions of entity e in $d_i$ that occur in the CD of $d_i$, NumMentionsOutCD($d_i$,e) denotes the number of mentions of entity e in $d_i$ that occur outside the CD of $d_i$ (in the body of $d_i$ but not in CD of $d_i$), and next_i(e) denotes the $i^{th}$ next entity in the ranking produced by the above scoring function.

The scores of the neighboring entities in the ranking are introduced into the feature vector so that the model can take into account the score distribution to decide the cut-off point. The model learns using training examples consisting of actual feature vectors and actual class labels (whether should be returned or not). Subsequently, the model is used to determine whether an entity should be returned to the user or not. The architecture allows the exploration of different feature sets as well as different machine learning models for picking the entities accurately.

Figure 5:
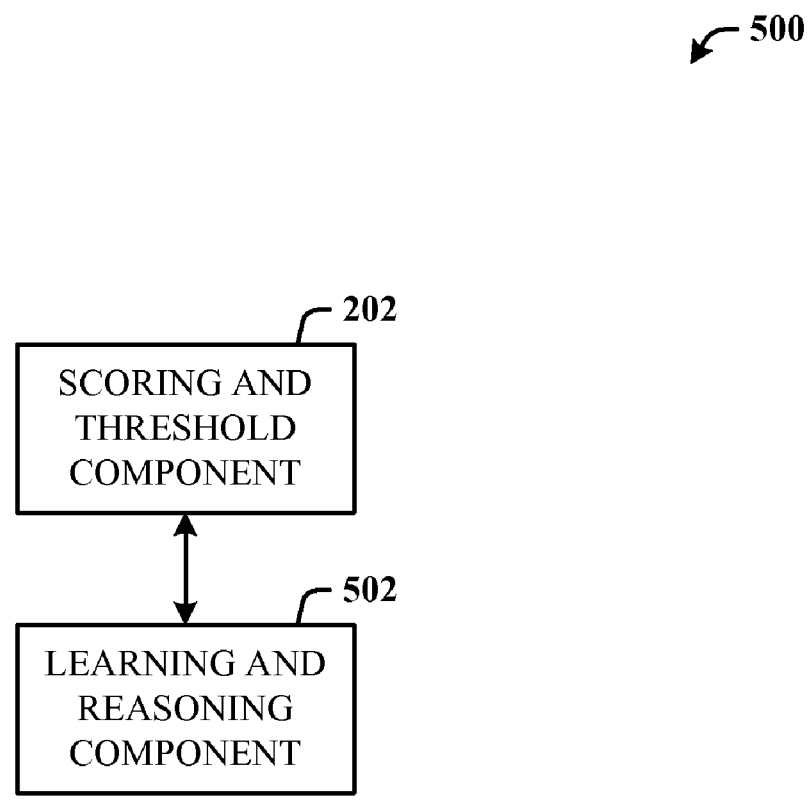
FIG. 5 illustrates a system that employs a machine learning and reasoning (LR) component for the scoring and threshold component.

FIG. 5 illustrates a system 500 that employs a machine learning and reasoning (LR) component 502 for the scoring and threshold component 202. The subject architecture (e.g., in connection with selection) can employ various MLR-based schemes for carrying out various aspects thereof. For example, a process for determining which entities to select can be facilitated via an automatic classifier system and process.

A classifier is a function that maps an input attribute vector, $x=(x_1, x_2, x_3, x_4, \ldots, x_n)$, where n is a positive integer), to a class label class(x). The classifier can also output a confidence that the input belongs to a class, that is, f(x)=confidence (class(x)). Such classification can employ a probabilistic and/or other statistical analysis (e.g., one factoring into the analysis utilities and costs to maximize the expected value to one or more people) to prognose or infer an action that a user desires to be automatically performed.

As used herein, terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, for example, various forms of statistical regression, naive Bayes, Bayesian networks, decision trees, neural networks, fuzzy logic models, and other statistical classification models representing different patterns of independence can be employed. Classification as used herein also is inclusive of methods used to assign rank and/or priority.

As will be readily appreciated from the subject specification, the subject architecture can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be employed to automatically learn and perform a number of functions according to predetermined criteria.

Following are a series of flow diagrams the represent methods in accordance with novel aspects of the disclosed architecture.

Figure 6:
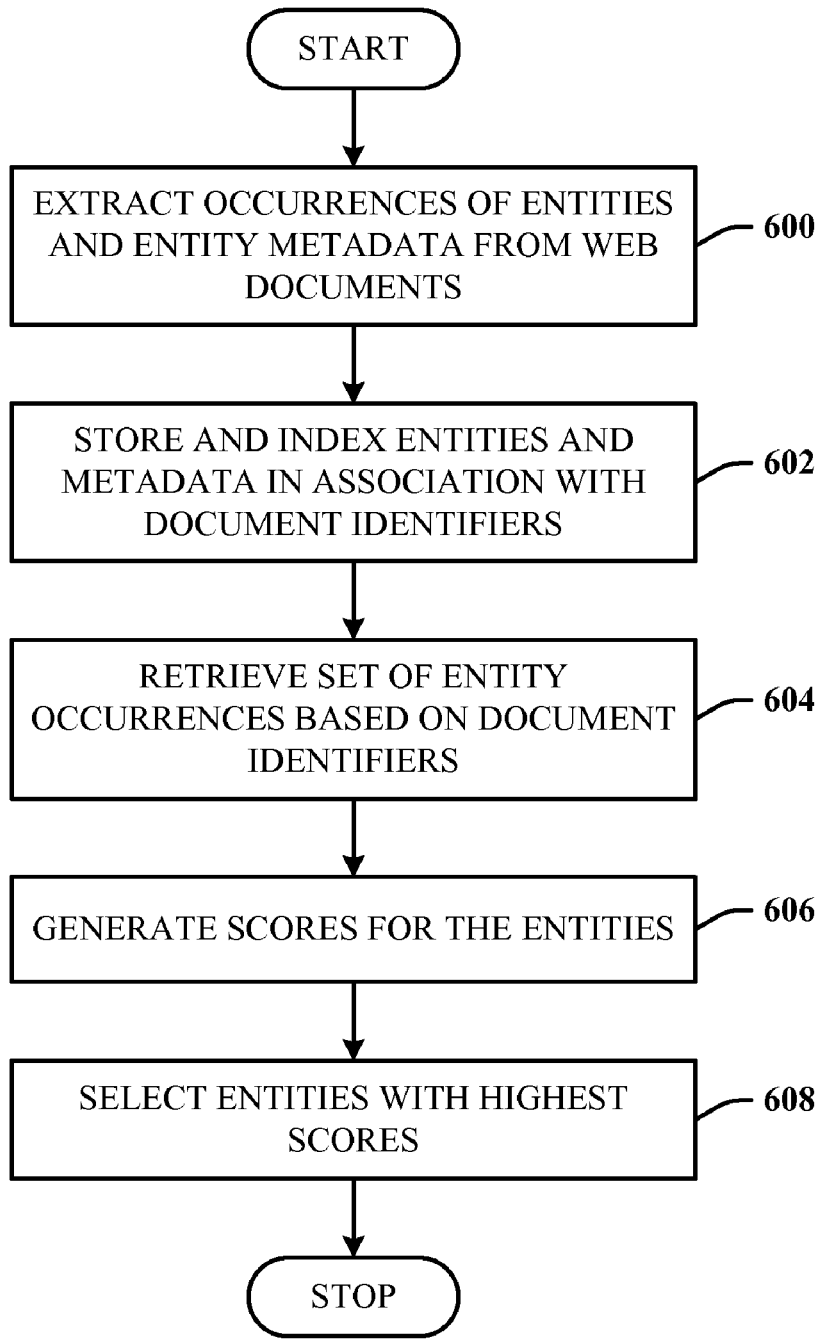
FIG. 6 illustrates a method of searching in accordance with the disclosed architecture.

FIG. 6 illustrates a method of searching in accordance with the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 600, occurrences of the entities and entity metadata are extracted from web documents. At 602, the entities and entity metadata are stored and indexed in association with corresponding document identifiers. At 604, a query is processed and document identifiers returned that are associated with document results of the query. At 606, a set of the occurrences is retrieved based on the document identifiers. At 608, scores are generated for the entities. At 610, the entities with the highest scores are selected.

Figure 7:
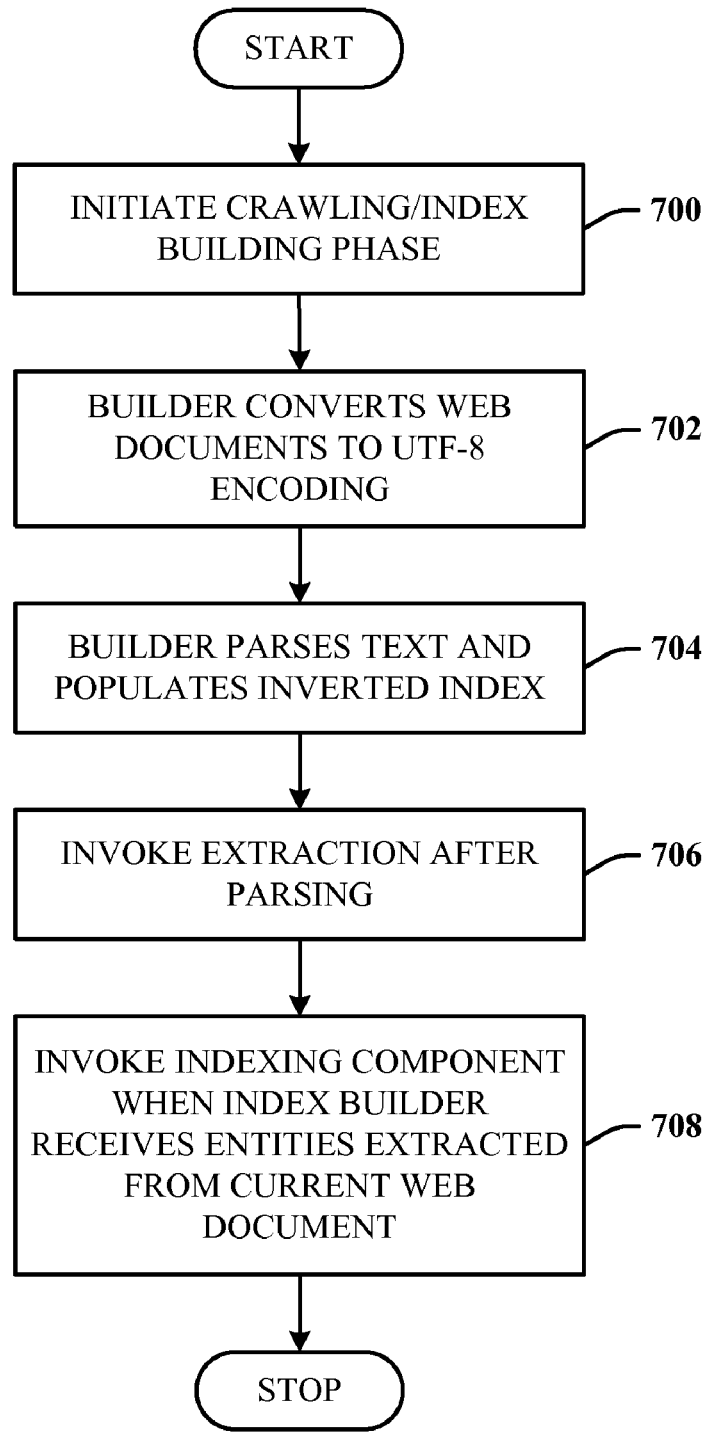
FIG. 7 illustrates a method of indexing web documents.

FIG. 7 illustrates a method of indexing web documents. At 700, a web crawling and index building phase is initiated. At 702, the builder converts web documents to UTF-8 encoding. At 704, the builder parses text from the documents and populates an inverted index. At 706, extraction is invoked after text parsing. At 708, the indexing component is invoked when the index builder receives entities extracted from the current web document.

Figure 8:
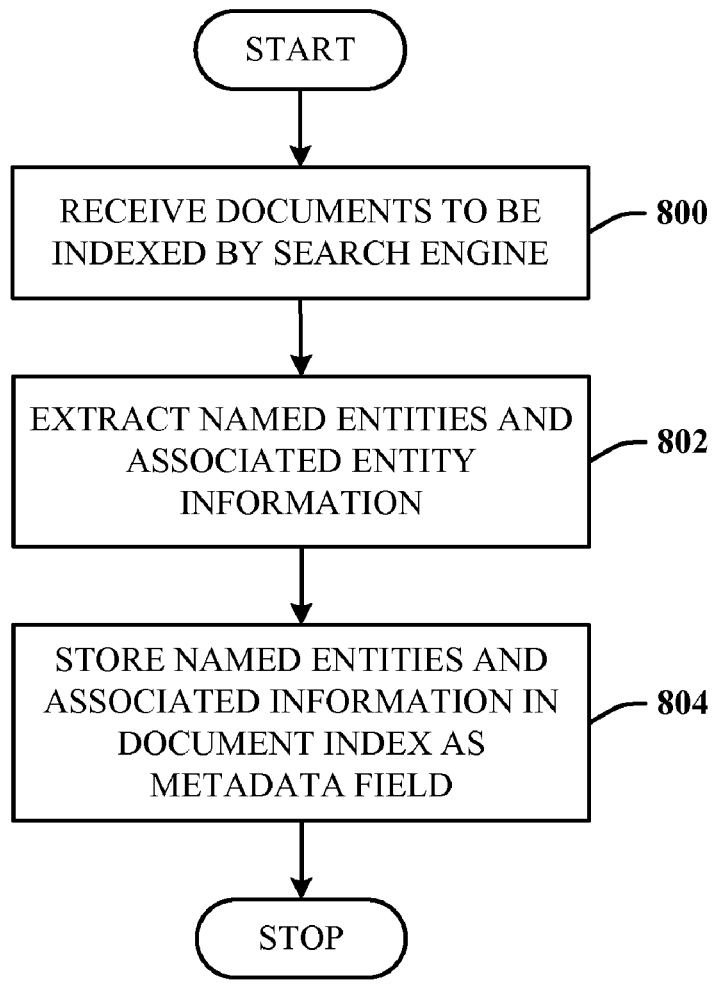
FIG. 8 illustrates a method of storing entity metadata as part of the document index.

FIG. 8 illustrates a method of storing entity metadata as part of the document index. At 800, documents are received for indexing by a search engine. At 802, the engine extracts named entities and associated entity information. At 804, the named entities and associated information is stored in a metadata field of the document index.

Figure 9:
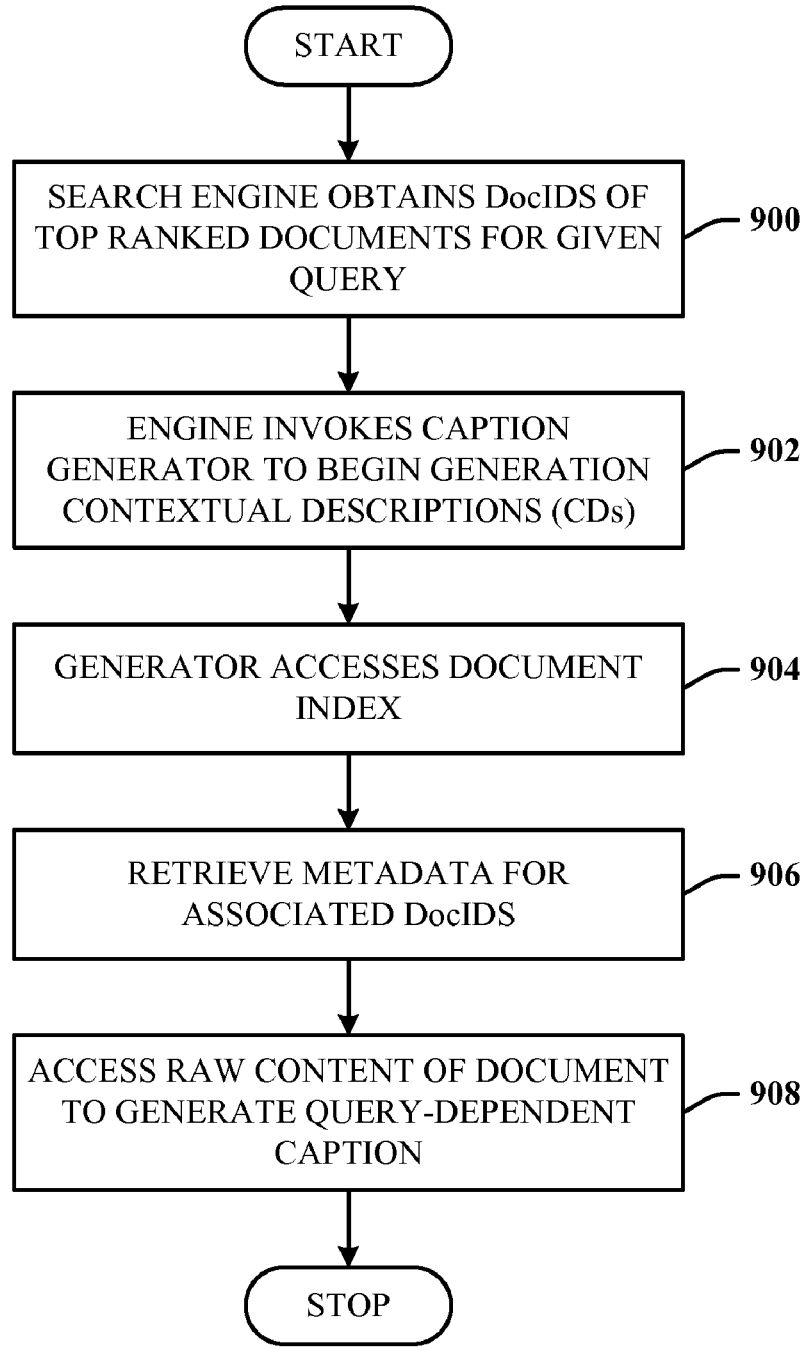
FIG. 9 illustrates a method of employing a caption generator for generating a query-dependent caption.

FIG. 9 illustrates a method of employing a caption generator for generating a query-dependent caption. At 900, a search engine obtains docIDs of top ranked documents for a given query. At 902, the engine invokes a caption generator to begin generation of contextual descriptions. At 904, the generator accesses a document index. At 906, metadata is retrieved for associated docIDs. At 908, raw document content is accessed to generate the query-dependent caption.

Figure 10:
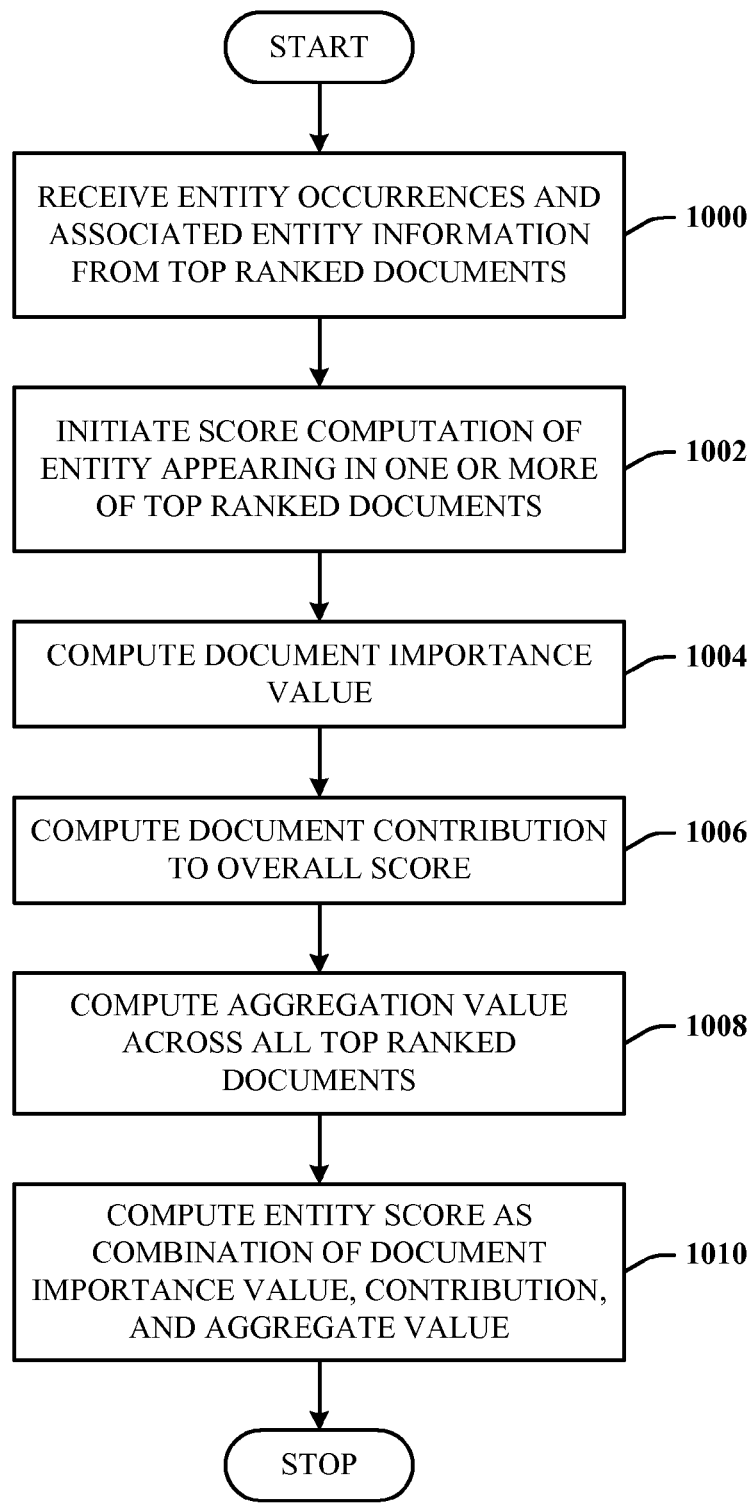
FIG. 10 illustrates a method of generating an entity score.

FIG. 10 illustrates a method of generating an entity score. At 1000, entity occurrences (or mentions) and associated entity information are received from the top ranked documents. At 1002, score computation is initiated for an entity appearing in one or more of the top ranked documents. At 1004, a document importance value is computed. At 1006, a document contribution value is computed. At 1008, an aggregation value across all top ranked documents is computed. At 1010, the entity score is computed as a combination of the document importance value, contribution value, and aggregate value.

Figure 11:
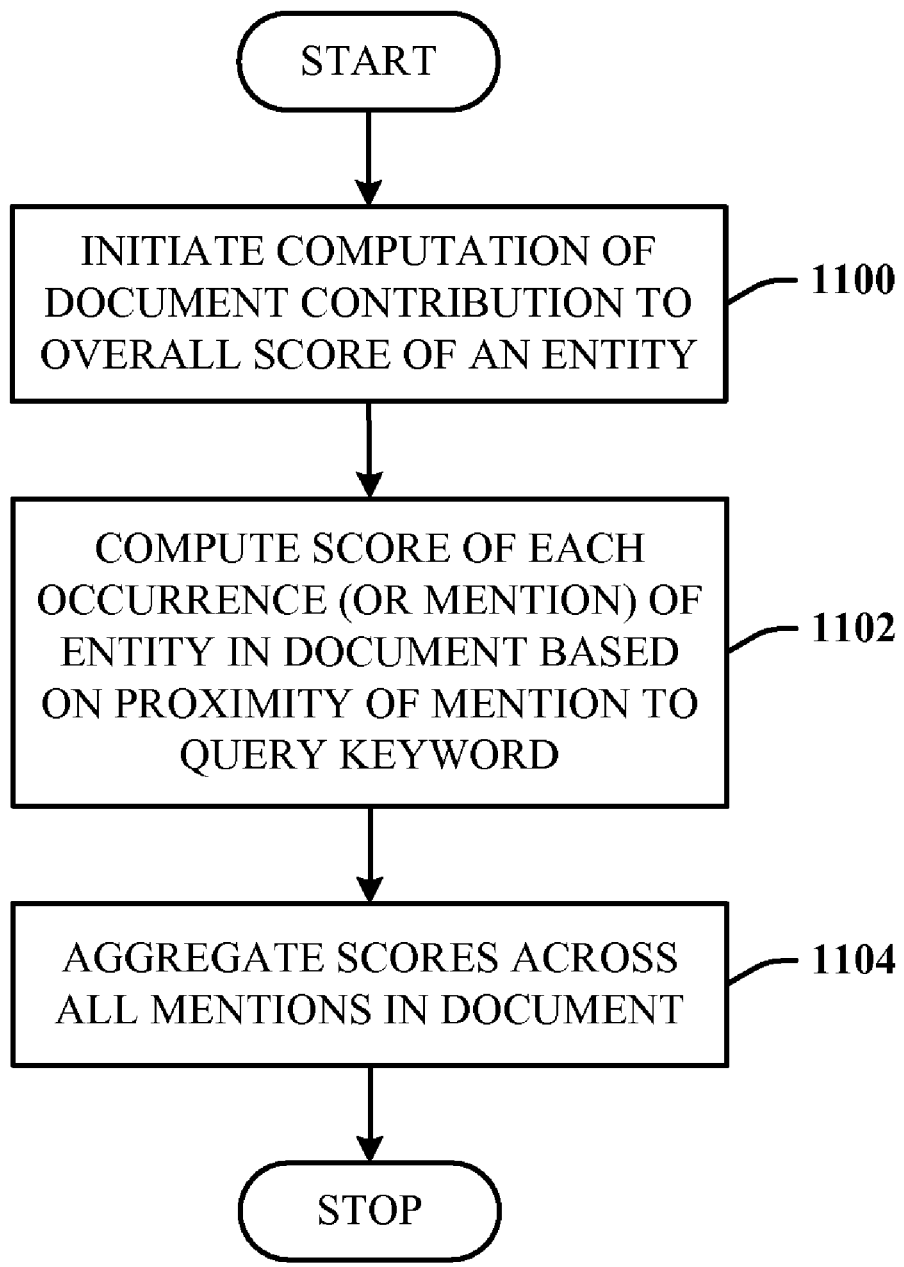
FIG. 11 illustrates a method of computing a document contribution value.

FIG. 11 illustrates a method of computing a document contribution value. At 1100, computation is initiated of a document contribution to the overall score of an entity. At 1102, a score is computed for each occurrence (or mention) of an entity in the document, based on proximity of the mention to a query keyword. At 1104, entity scores are aggregated across all mentions in the document.

Figure 12:
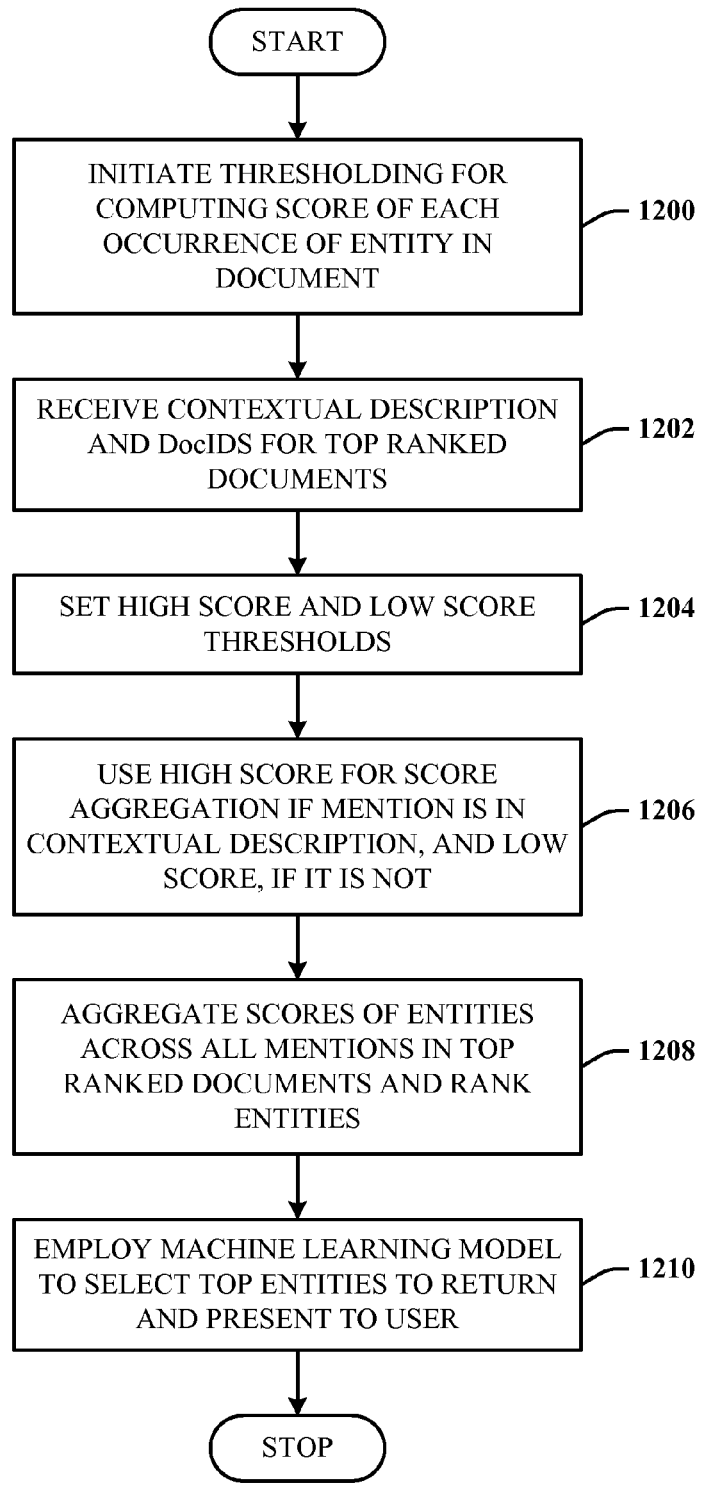
FIG. 12 illustrates a method of employing thresholding for score generation.

FIG. 12 illustrates a method of employing thresholding for score generation. At 1200, thresholding is initiated for computing a score for each occurrence of an entity in the document. At 1202, contextual description information and docIDs are received for the top ranked documents. At 1204, a high score and low score thresholds are set. At 1206, the high score is utilized for score aggregation if a mention is in the contextual description, and the low score is utilized if it is not. At 1208, the scores of entities are aggregated across all top ranked documents, and rank entities. At 1210, employ machine learning model to select top entities to return to user, and present to user.

Figure 13:
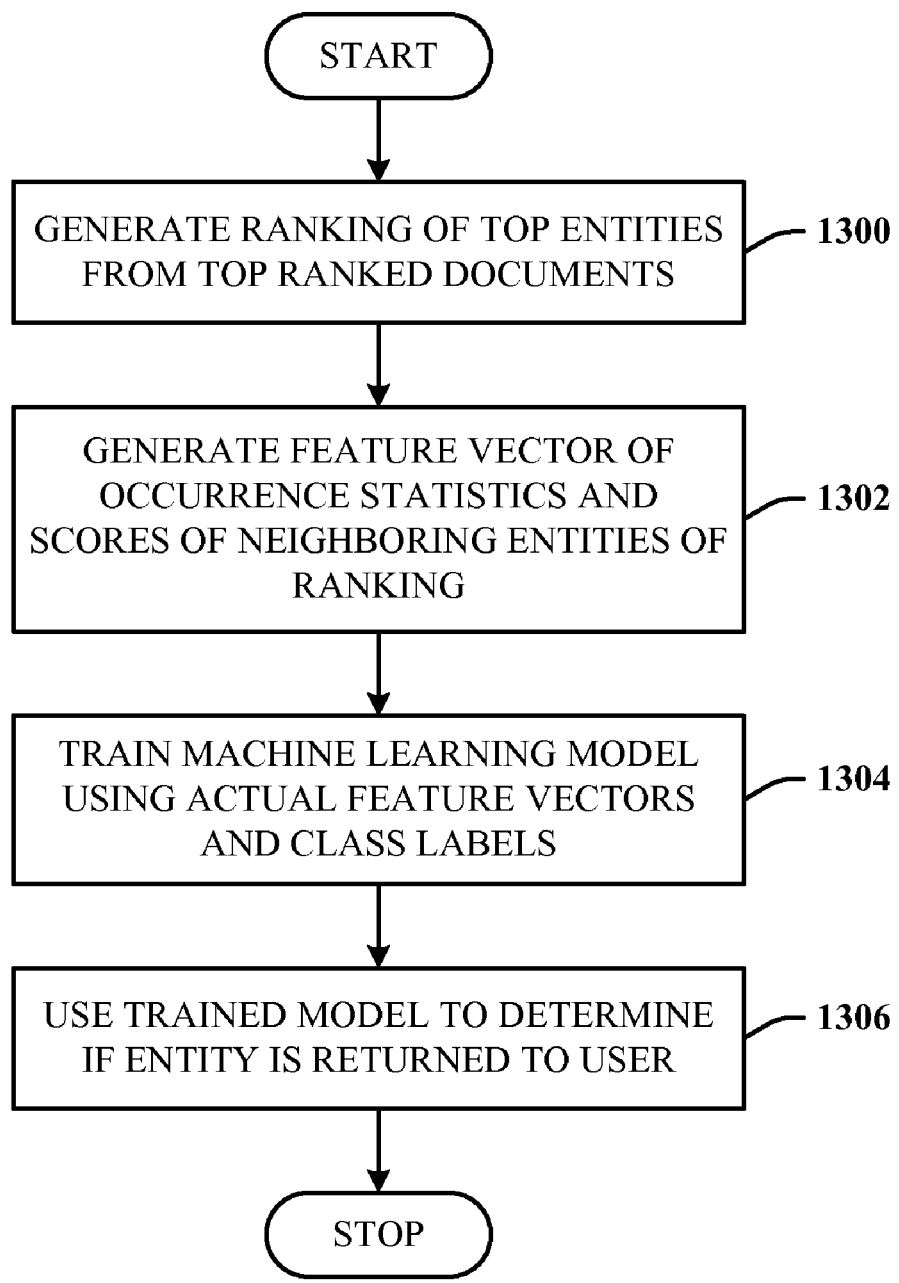
FIG. 13 illustrates a method of employing feature vectors for machine learning and entity processing.

FIG. 13 illustrates a method of employing feature vectors for machine learning and entity processing. At 1300, a ranking of the top entities form the top ranked documents is generated. At 1302, a feature vector is generated of occurrence statistics and score of neighboring entities of the ranking. At 1304, the model is trained using actual feature vectors and class labels. At 1306, the trained model is used to determine if an entity is to be returned to the user.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 14:
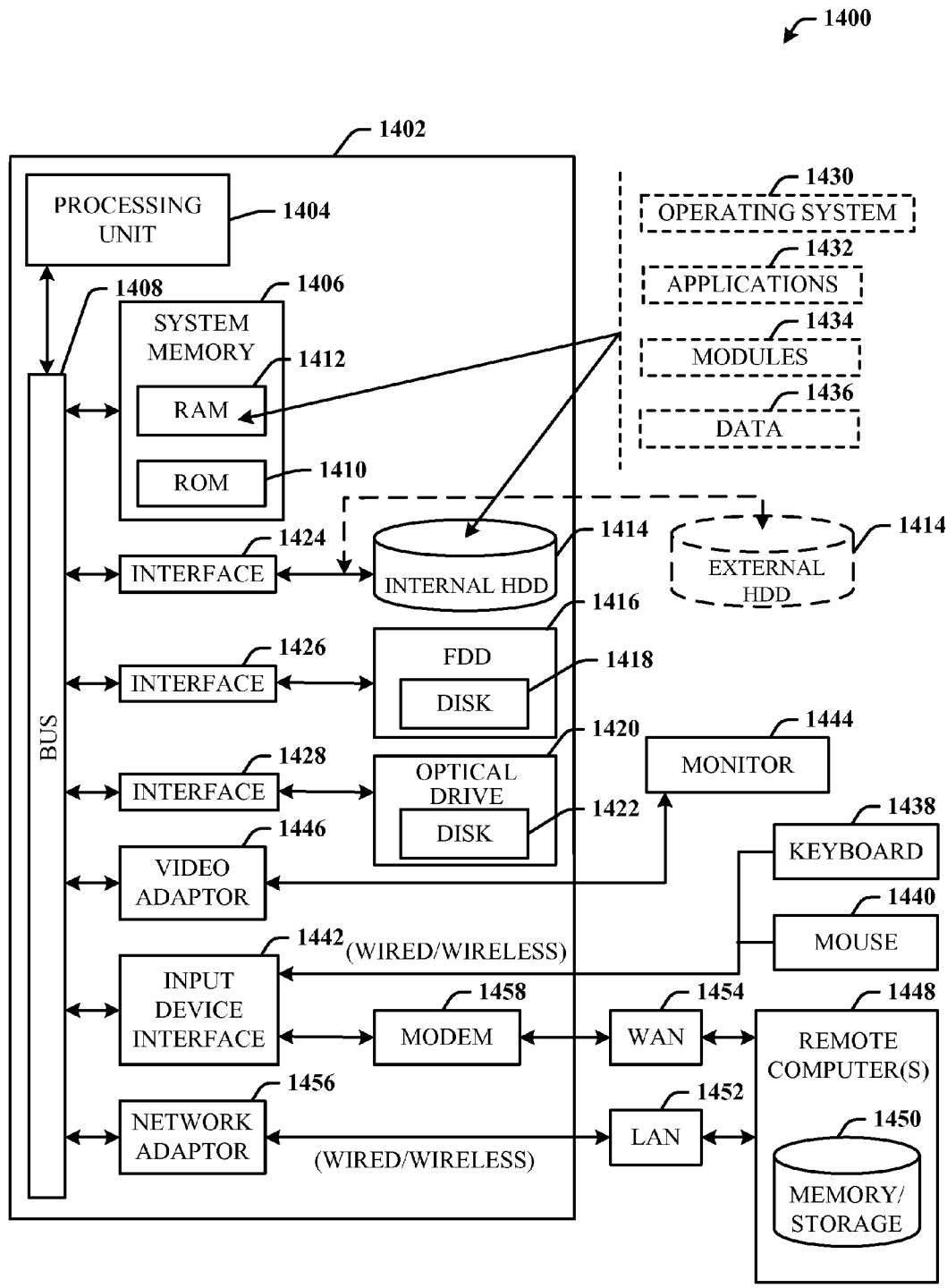
FIG. 14 illustrates a block diagram of a computing system operable to find related entities to a web search query in accordance with the disclosed architecture.

Referring now to FIG. 14, there is illustrated a block diagram of a computing system 1400 operable to find related entities to a web search query in accordance with the disclosed architecture. In order to provide additional context for various aspects thereof, FIG. 14 and the following discussion are intended to provide a brief, general description of a suitable computing system 1400 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 14, the exemplary computing system 1400 for implementing various aspects includes a computer 1402, the computer 1402 including a processing unit 1404, a system memory 1406 and a system bus 1408. The system bus 1408 provides an interface for system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 1412, including an operating system 1430, one or more application programs 1432, other program modules 1434 and program data 1436. The one or more application programs 1432, other program modules 1434 and program data 1436 can include the indexing component 102, entity data 104, documents 106, document IDs 108, datastore 110, document-based search component 112, retrieval component 114, scoring and threshold component 202, and extraction component 204 of FIG. 2, and learning and reasoning component 502 of FIG. 5, for example.

All or portions of the operating system, applications, modules, and/or data can also be cached in the RAM 1412. It is to be appreciated that the disclosed architecture can be implemented with various commercially available operating systems or combinations of operating systems.

A user can enter commands and information into the computer 1402 through one or more wire/wireless input devices, for example, a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wire and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the local network 1452 through a wire and/or wireless communication network interface or adapter 1456. The adaptor 1456 may facilitate wire or wireless communication to the LAN 1452, which may also include a wireless access point disposed thereon for communicating with the wireless adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 15:
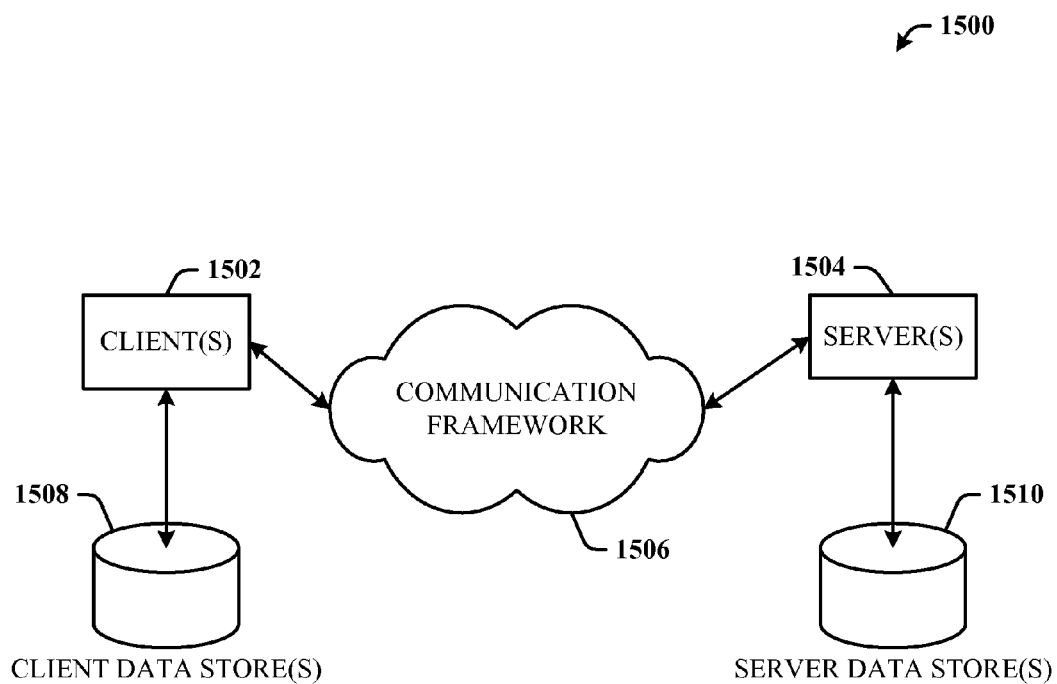
FIG. 15 illustrates a schematic block diagram of an exemplary computing environment for finding related entities to a web search query in accordance with the disclosed architecture.

Referring now to FIG. 15, there is illustrated a schematic block diagram of an exemplary computing environment 1500 for finding related entities to a web search query in accordance with the disclosed architecture. The system 1500 includes one or more client(s) 1502. The client(s) 1502 can be hardware and/or software (e.g., threads, processes, computing devices). The client(s) 1502 can house cookie(s) and/or associated contextual information, for example.

The system 1500 also includes one or more server(s) 1504. The server(s) 1504 can also be hardware and/or software (e.g., threads, processes, computing devices). The servers 1504 can house threads to perform transformations by employing the architecture, for example. One possible communication between a client 1502 and a server 1504 can be in the form of a data packet adapted to be transmitted between two or more computer processes. The data packet may include a cookie and/or associated contextual information, for example. The system 1500 includes a communication framework 1506 (e.g., a global communication network such as the Internet) that can be employed to facilitate communications between the client(s) 1502 and the server(s) 1504.

Communications can be facilitated via a wire (including optical fiber) and/or wireless technology. The client(s) 1502 are operatively connected to one or more client data store(s) 1508 that can be employed to store information local to the client(s) 1502 (e.g., cookie(s) and/or associated contextual information). Similarly, the server(s) 1504 are operatively connected to one or more server data store(s) 1510 that can be employed to store information local to the servers 1504.

The servers 1504 can include the system 100, and alternative systems 200, 300 and 500, for example. It is to be appreciated that such systems can also operate from the clients 1502, or as a combination of the clients 1502 and servers 1504.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented search system, comprising:
    an extraction component configured to extract named entities from documents having corresponding document identifiers;
    an indexing component configured to create and store:
        a document index that indexes the named entities by the document identifiers to indicate whether the named entities occur in the documents; and
        an inverted index that indexes the document identifiers by word identifiers of words that occur in the documents, wherein the document index and the inverted index are at least partly created in advance of receiving a keyword query from a user;
    a document-based search component configured to:
        receive the keyword query from the user, the keyword query comprising keywords; and
        provide the keywords to the inverted index to identify individual document identifiers corresponding to individual matching documents that match one or more of the keywords of the keyword query;
    a retrieval component configured to:
        retrieve direct matching document entities that directly match at least one of the keywords of the keyword query; and
        provide the individual document identifiers to the document index and retrieve co-occurring related named entities from the document index, wherein the co-occurring related named entities do not directly match the keywords of the keyword query but occur in the individual matching documents with the direct matching document entities; and
    a scoring component configured to:

compute aggregate relevance scores for the co-occurring related named entities that occur in the individual matching documents; and return one or more of the co-occurring related named entities in response to the keyword query based on the aggregate relevance scores; and at least one processing unit configured to execute one or more of the extraction component, the indexing component, the document-based search component, the retrieval component, or the scoring component.

2. The system of claim 1, wherein the returned one or more co-occurring related named entities are selected based upon one or more of: a number of co-occurrences or positional proximity to an individual direct matching document entity.

3. The system of claim 1, wherein the named entities are associated with at least one of an entity type or entity position in the documents.

4. The system of claim 1, wherein the document-based search component is configured to return the individual document identifiers corresponding to the individual matching documents according to rank.

5. The system of claim 4, wherein the retrieval component is configured to retrieve a number of the co-occurring related named entities in the returned individual matching documents.

6. The system of claim 5, wherein the scoring component is further configured to compute the aggregate relevance score for the co-occurring related named entities based on the number of co-occurrences.

7. The system of claim 1, further comprising a machine learning and reasoning component for computing a threshold on which selection of the one or more co-occurring related named entities to return is based.

8. The system of claim 1, wherein the scoring component is further configured to compute an individual aggregate relevance score based on proximity of an occurrence of an individual co-occurring related named entity to an individual query keyword in at least one of the individual matching documents.

9. The system of claim 1, the extraction component being configured to extract all occurrences of the named entities.

10. A method comprising:
extracting named entities from documents having corresponding document identifiers;
creating and storing:
 a document index that indexes the named entities by the document identifiers to indicate whether the named entities occur in the documents; and
 an inverted index that indexes the document identifiers by word identifiers of words that occur in the documents, wherein the document index and the inverted index are at least partly created in advance of receiving a keyword query from a user;
receiving the keyword query from the user, the keyword query comprising keywords;
providing the keywords to the inverted index to identify individual document identifiers corresponding to individual matching documents that match one or more of the keywords of the keyword query;
retrieving direct matching document entities that directly match at least one of the keywords of the keyword query;
providing the individual document identifiers to the document index and retrieving co-occurring related named entities from the document index, wherein the co-occurring related named entities do not directly match the keywords of the keyword query but occur in the individual matching documents with the direct matching document entities;
computing aggregate relevance scores for the co-occurring related named entities that occur in the individual matching documents; and
returning one or more of the co-occurring related named entities in response to the keyword query based on the aggregate relevance scores,
wherein at least the computing the aggregate relevance scores is performed using a processing unit.

11. The method according to claim 10, wherein the named entities are stored in the document index as document metadata.

12. The method according to claim 10, wherein the named entities comprise at least one proper name of an individual.

13. The method according to claim 10, further comprising generating a query-dependent caption for at least one of the individual matching documents.

14. The method according to claim 10, further comprising:
computing a score for individual occurrences of the co-occurring related named entities based on proximity of the individual occurrences to individual keywords in the individual matching documents.

15. One or more computer-readable memory devices or storage devices having computer-readable instructions stored thereon that, when executed by one or more computing devices, cause the one or more computing devices to perform:
extracting named entities from documents having corresponding document identifiers;
creating and storing:
 a document index that indexes the named entities by the document identifiers to indicate whether the named entities occur in the documents; and
 an inverted index that indexes the document identifiers by word identifiers of words that occur in the documents, wherein the document index and the inverted index are at least partly created in advance of receiving a keyword query from a user;
receiving the keyword query from the user, the keyword query comprising keywords;
providing the keywords to the inverted index to identify individual document identifiers corresponding to individual matching documents that match one or more of the keywords of the keyword query;
retrieving direct matching document entities that directly match at least one of the keywords of the keyword query;
providing the individual document identifiers to the document index and retrieving co-occurring related named entities from the document index, wherein the co-occurring related named entities do not directly match the keywords of the keyword query but occur in the individual matching documents with the direct matching document entities;
computing aggregate relevance scores for the co-occurring related named entities that occur in the individual matching documents; and
returning one or more of the co-occurring related named entities in response to the keyword query based on the aggregate relevance scores.

16. The one or more computer-readable memory devices or storage devices according to claim 15, the individual matching documents comprising a top matching subset of documents for the keyword query.

17. The one or more computer-readable memory devices or storage devices according to claim 15, having further computer-readable instructions stored thereon that when executed by one or more computing devices cause the one or more computing devices to perform:

ranking the co-occurring related named entities based on a number of matching keywords.

18. The one or more computer-readable memory devices or storage devices according to claim 15, having further computer-readable instructions stored thereon that when executed by one or more computing devices cause the one or more computing devices to perform:

ranking the co-occurring related named entities based on an inverse document frequency of the keywords.

19. The one or more computer-readable memory devices or storage devices according to claim 15, having further computer-readable instructions stored thereon that when executed by one or more computing devices cause the one or more computing devices to perform:

standardizing a first one of the co-occurring named entities before returning the first co-occurring named entity.

20. The one or more computer-readable memory devices or storage devices according to claim 19, the standardizing comprising standardizing an abbreviation to a corresponding unabbreviated word.

* * * * *